(12) United States Patent
Fujiuchi et al.

(10) Patent No.: US 7,978,379 B2
(45) Date of Patent: Jul. 12, 2011

(54) IMAGE SENSOR

(75) Inventors: Akiko Fujiuchi, Tokyo (JP); Akira Ota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 998 days.

(21) Appl. No.: 11/830,192

(22) Filed: Jul. 30, 2007

(65) Prior Publication Data

US 2008/0212148 A1 Sep. 4, 2008

(30) Foreign Application Priority Data

Mar. 1, 2007 (JP) ................... 2007-051314

(51) Int. Cl.
*H04N 1/04* (2006.01)
*H04N 1/42* (2006.01)

(52) U.S. Cl. ........ 358/475; 358/510; 358/511; 358/481; 358/482; 358/480; 358/484; 382/317

(58) Field of Classification Search .................. 358/475, 358/510, 511, 481, 482, 480, 484
See application file for complete search history.

(56) References Cited

U.S. PATENT DOCUMENTS

| 6,122,105 A * | 9/2000 | Kawai et al. ................. 359/618 |
| 2002/0015193 A1 | 2/2002 | Tabata | |

FOREIGN PATENT DOCUMENTS

| EP | 1 511 289 A1 | 3/2005 |
| EP | 1511289 A1 * | 3/2005 |
| JP | 7-319082 | 12/1995 |
| JP | 2002-185708 | 6/2002 |
| JP | 2003-348299 | 12/2003 |
| JP | 2004-40821 | 2/2004 |
| JP | 2004-48290 | 2/2004 |
| JP | 2005-102112 | 4/2005 |
| JP | 2006-14081 | 1/2006 |

\* cited by examiner

*Primary Examiner* — David K Moore
*Assistant Examiner* — Quang N Vo
(74) *Attorney, Agent, or Firm* — Oblon, Spivak, McClelland, Maier & Neustadt, L.L.P.

(57) ABSTRACT

An image sensor includes a light source; a bar-shaped light-guiding element having a first light-emitting section, which propagates light from the light source and irradiates an document from an oblique direction, and a second light-emitting section emitting light in a carrying direction of the document; a lens converging the light reflected from the document; a sensor receiving the light passed through the lens; a reflector disposed on the opposite side of the light-guiding element, by reflecting the light from the second light-emitting section such that an optical path of the light emitted from the second light-emitting section is located between the lens and the document, and irradiating the document from an oblique direction; and first and second light-scattering layers formed in areas opposed to the first and the second light-emitting sections, respectively, in the light-guiding element.

3 Claims, 9 Drawing Sheets

IMAGE SENSOR

BACKGROUND OF THE INVENTION

1. Field of the Invention

The present invention relates to an image sensor used for scanners or bill discriminators.

2. Description of the Related Art

In a one-dimensional scanning line image sensor, it is universal taking arrangements in which a document is irradiated from a plurality of directions in order to ensure a reading performance of the document waving due to such as rumples. For example, JP-A2006-014081 (see Patent Document 1) discloses, in FIG. 1, an image reader equipped with a lighting apparatus 3 irradiating light to a reading position of a document from both sides thereof.

Further, JP-A2004-048290 (see Patent Document 2) discloses, in FIG. 1, an image sensor including a light source 2 illuminating an illuminated object O; and a reflecting member 4 that is disposed at a position opposed to the light source 2 and directs part of the light from the light source 2 toward the illuminated object O so as to rationalize a balance of the quantity of light to direct light from a light source using an auxiliary reflecting mirror, and cancel a shadow; wherein shielding members 9, 9' are provided between the light source 2 and the illuminated object O, and between the reflecting member 4 and the illuminated object O, and the shielding members 9, 9' shield irradiated light from the light source 2 and reflected light from the reflecting member 4 at a fixed rate.

Furthermore, JP-A07-319082 (see Patent Document 3) discloses, in FIG. 1, a lighting apparatus of an image forming device in which a second sub-reflector 7c is elastically deformably provided in a thickness direction to simplify an arrangement which adjusts the quantity of light impinging on a document from a bar-shaped light source, and the quantity of light from a light source 5 striking on the document is adjusted by displacing the second sub-reflector 7c by rotation of a screw shaft 12.

Moreover, JP-A2003-348299 (see Patent Document 4) discloses, in FIG. 1, a line lighting apparatus which includes a light-emitting face 17 emitting light incident on a square bar-shaped light-guiding element 1 from a light source 2 to a corner along a longitudinal direction of the light-guiding element 1; light scattering patterns being not provided at an area in the vicinity of the light source 2, out of two sides where the reflected quantity of light incident on the light-emitting face 17 becomes maximum; light scattering patterns 18b being provided at an area remote from the light source; and light scattering patterns 18a being provided at an area to the light source in at least one side, out of two sides orthogonal to a side where the quantity of reflected light becomes maximum. This prevents a shortage of the quantity of light from an area in the proximity of the light source 2, which precludes the non-uniform emitting quantity of light from the light-emitting face 17 along a longitudinal direction of the light-guiding element 1.

Patent Document 1: JP-A2006-014081 (FIG. 1)
    Patent Document 2: JP-A2004-048290 (FIG. 1)
    Patent Document 3: JP-A7-319082 (FIG. 1)
    Patent Document 4: JP-A2003-348299 (FIG. 1)

However, although the image reader described in the Patent Document 1 achieves image formation of a clear image even when a document is partially lifting, the image reader must build in a linear lighting apparatus in each side of the document. Consequently, the image reader rises in price.

Further, in the image sensor described in the Patent Document 2, a reflecting member is provided opposed to the light source such as a halogen lamp, and a shielding member is provided on an under surface of a light-transmitting member, thus shielding irradiated light from the light source 2 and reflected light from the reflecting member at a certain ratio. However, the provision of the shielding member incurs a loss of illuminating light, which decreases luminous intensity on a surface of the document and impairs efficiency.

Furthermore, in the lighting apparatus described in the Patent Document 3, the quantity of light from the light source 5 impinging on the document can be adjusted as a dimmer plate is displaceable in a swinging manner in a direction where a free end of the plate draws near to or goes away from a document by using second sub-reflectors. However, each of the second sub-reflectors demands mechanical adjustment at the time of adjustment of the quantity of light, thus complicating the adjustment.

In the linear lighting apparatus described in the Patent Document 4, light scattering patterns are formed to the main face (the side where reflected light becomes maximum) of the bar-shaped light-guiding element of which section including the light-emitting face is pentagonal, and at the same time, to the side adjacent to the main face of one end of the light source. The labors for uniformity of the quantity of emitted light; however, this apparatus includes only a one-side light source. Accordingly, the Patent Document 4 makes no mention of insuring a reading performance of a document waving due to such as rumbles, as is demonstrated by the present invention.

SUMMARY OF THE INVENTION

The present invention has been made to solve the above-mentioned problems, and an object of the present invention is to provide a new image sensor able to secure efficient luminous intensity on a document, by arranging the sensor so as to irradiate light to shaded areas of the document, where the document is waving due to such as rumples, even when shadows are produced on crumpled portions of the document resulted from shielding of an illumination of light.

The image sensor according to the present invention includes a light source; a bar-shaped light-guiding element having a first light-emitting section causing light from the light source to be propagated and irradiating the light an irradiated portion of the document from an oblique direction and a second light-emitting section emitting light in a carrying direction of the document; a lens converging the light reflected from the irradiated portion of the document; a sensor receiving the light passed through the lens; a reflector disposed on the opposite side of the light-guiding element with respect to the lens, and reflecting the light from the second light-emitting section such that an optical path of the light from the second light-emitting section is located between the lens and the document, and irradiating the light to the irradiated portion of the document from an oblique direction; and first and second light-scattering layers, each being formed in areas opposed to the first and the second light-emitting sections in the light-guiding element.

In the image sensor according to the present invention, the width of the second light-scattering layer is formed wider than that of the first light-scattering layer.

In the image sensor according to the present invention, a flat portion is formed on the light-guiding element and the second light-scattering layer is formed over the flat portion.

In the image sensor according to the present invention, the first and the second light-scattering layers are placed in pairs or alternately.

In the image sensor according to the present invention, the light source is disposed at one end of the light-guiding element.

In the image sensor according to the present invention, the first and the second light scattering layers are formed larger in size in a longitudinal direction of the light-guiding element with distance from the light source.

Further, the image sensor according to the present invention includes a light source; a bar-shaped light-guiding element having a first light-emitting section causing light from the light source to be propagated and irradiating light to an irradiated portion of a document from an oblique direction and a second light-emitting section emitting light in a carrying direction of the document; a lens converging the light reflected from the irradiated portion of the document; a sensor receiving the light passed through this lens; a reflector disposed on the opposite side of the light-guiding element with respect to the lens, and reflecting the light from the second light-emitting section so that an optical path of the light from the second light-emitting section is located between the lens and the document, and irradiating the light to the irradiated portion of the document from an oblique direction; first and second light-scattering layers, each being formed in areas opposed to the first and the second light-emitting sections in the light-guiding element; and a shielding cover covering the outside of the light-guiding element, including the first and the second light scattering layers except the first and the second light-emitting sections.

In the image sensor according to the present invention, the shading cover is formed between the first light-emitting section and the second light-emitting section.

Moreover, the image sensor according to the present invention includes a light source; a bar-shaped light-guiding element having a first light-emitting section causing light from the light source to be propagated and irradiating light to an irradiated portion of a document from an oblique direction and a second light-emitting section emitting the light from the light source in a carrying direction of the document; a lens converging the light reflected from the irradiated portion of the document in an optical axis direction; a sensor receiving the light passed through the lens; a reflector disposed on the opposite side of the light-guiding element with respect to the lens, and reflecting the light from the second light-emitting section such that an optical path of the light from the second light-emitting section is located between the lens and the document, and irradiating the light to the irradiated portion of the document from an oblique direction; and first and second light-scattering layers, each being formed in areas opposed to the first and the second light-emitting sections in the light-guiding element, wherein let the distance in a carrying direction of the document between an center axis of the reflector and the irradiated portion of the document be L, the distance in the optical axis direction between the center axis of the reflector and the irradiated portion of the document is within the range of $L/2$ to $\sqrt{3} \cdot L$.

In the image sensor according to the present invention, the optical path length between an end of incidence of the lens and the irradiated portion of the document in the optical axis direction is made equal to the optical path length between the end of incidence of the lens and the sensor in the optical axis direction.

As described above, according to the present invention, since even when a document is waving due to such as rumples, it reduces production of shadows in crumpled portions of the document caused by shielding of light. This insures efficient luminous intensity on a surface of the document.

DETAILED DESCRIPTION OF THE PREFERRED EMBODIMENTS

First Embodiment

Figure 1:
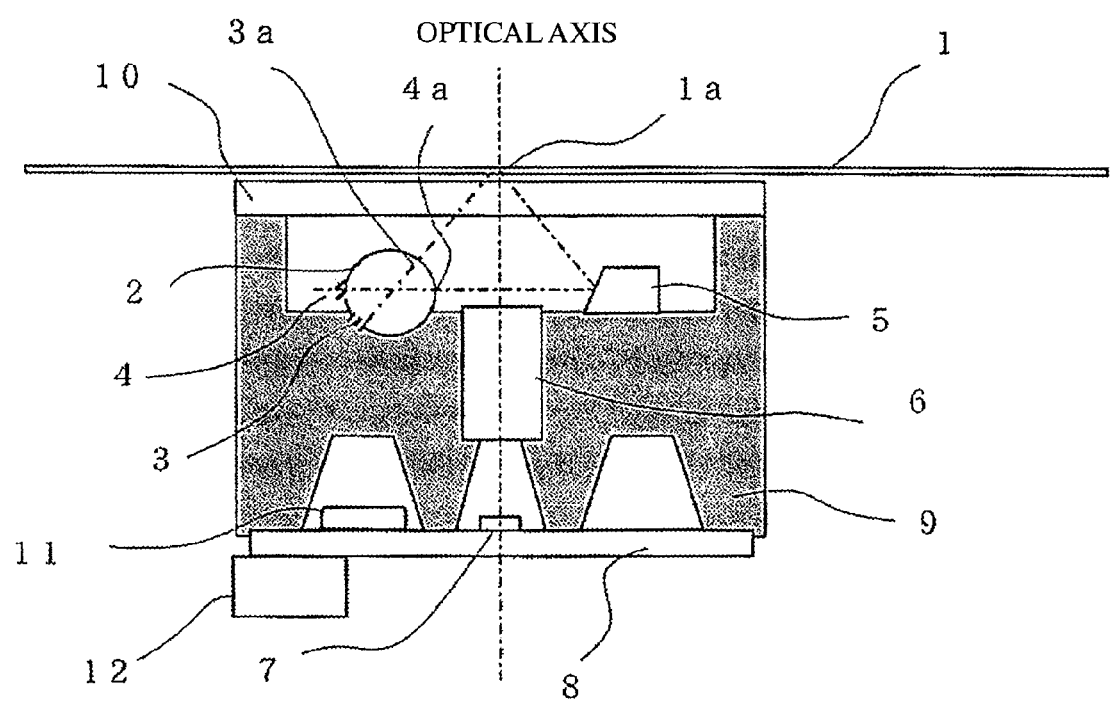
FIG. 1 is a sectional view of an image sensor according to the first embodiment of the present invention.

The first embodiment of the present invention will now be described with reference to FIG. 1. FIG. 1 is a sectional view of a contact image sensor according to the first embodiment. Referring to FIG. 1, reference numeral 1 denotes a document, i.e., media to be read, which is image information such as bank notes, securities, or another general documents etc. Reference numeral 2 denotes a bar-shaped light-guiding element extended in a longitudinal direction (in a perpendicular direction to space). Here, a cylindrical bar-shaped light-guiding element is used. Reference numeral 3 denotes a first light-scattering layer (reflecting pattern) formed along the light-guiding element 2. The first light-scattering layer 3 is formed on a surface of the light-guiding element 2, opposed to the center of the light-guiding element 2 of a first light-emitting section 3a such that light emitted from the first light-emitting section 3a of the light-guiding element 2 irradiates the light to the irradiated portion 1a of the document 1. Reference numeral 4 denotes a second light-scattering layer (reflecting pattern) formed along the light-guiding element 2. The second light-scattering layer 4 is formed on a surface of the light-guiding element 2, opposed to the center of the light-guiding element 2 of a second light-emitting section 4a such that light emitted from the second light-emitting section 4a of the light-guiding element 2 irradiates the center of a reflector, which will be described later. Because the light-guiding element 2 is of a bar-shaped configuration, it enables the first light-scattering layer 3 and the second light-scattering layer 4 to take the arrangements in this way, thereby allowing efficient light emission to the irradiated portion 1a of the document 1 from the first light-emitting section 3a and the second light-emitting section 4a. Here, it should be understood in the first embodiment that the light-emitting section 3a and the second light-emitting section 4a of the light-guiding element 2 do not take a definite form in a physical sense, and portions of the light-guiding element 2 from which direct light and indirect light reflected from the reflector 5 are incident on the irradiated portion 1a of the document 1 are referred to as the first light-emitting section 3a and the second light-emitting section 4a.

Reference numeral 5 denotes the reflector, which is arranged to reflect light impinged thereon and irradiates the light to the irradiated portion 1a of the document 1. Further, the width of the second light-scattering layer 4 is wider than that of the first light-scattering layer 3. This is to balance the quantity of light between the light incident on the irradiated portion 1a of the document 1 by way of the reflector 5, which is emitted from the second light-emitting section 4a, and the light directly incident on the irradiated portion 1a of the document 1, which is emitted from the first light-emitting section 3a.

Thus, both of the light, one of which is emitted from the first light-emitting section 3a of the light-guiding element 2 and the other of which is emitted from the second light-emitting section 4a in a carrying direction of the document 1 and then is reflected from the reflector 5, are incident aslant on the irradiated portion 1a of the document 1 from directions different from each other relative to the irradiated portion of the document.

Hereupon, in FIG. 1, the second light-emitting section 4a emits light in a carrying direction of the document 1. However, as will be mentioned later, when the light-guiding element 2 and the reflector 5 are mutually transposed, light emitted from the second light-emitting section 4a travels in the opposite direction relative to the carrying direction of the document 1 in a strict sense. It shall be named generically hereinafter as the carrying direction of the document, including such a case. Further, the carrying direction of the document is not defined in a strict sense. For example, when the reflector 5 is brought somewhat close to the document, or is kept somewhat away therefrom, light emitted from the second light-emitting section 4a travels slightly in an oblique direction in order for the light to be incident on the reflector 5. Even in such a case, the direction shall be referred to as the carrying direction of the document in a broad sense.

Then, reference numeral 6 denotes a rod lens array (lens), which is arranged such that light reflected from the irradiated portion 1a of the document 1 impinges from the optical axis direction, and converges the reflected light. On this occasion, it is necessary to adjust by the end of incidence of the rod lens array 6 a positional relationship of the rod lens array 6, the light-guiding element 2, and the reflector 5 such that light emitted from the second emitting section 4a of the light-guiding element 2 does not intervene in the optical path leading to the reflector 5. Reference numeral 7 denotes a sensor (light-receiving section), which is disposed on the optical axis, and receives the light converged by the rod lens array 6, with the sensor mounted thereon a photoelectric-converting section composed of semiconductor chips and other driving circuits. Reference numeral 8 denotes a sensor substrate for signal processing of an output of the photoelectric conversion received by the sensor 7. Reference numeral 9 denotes a casing, which houses and holds the rod lens array 6, the sensor substrate 8, the light-guiding element 2, and the reflector 5, and is made of plastic or the like. Reference numeral 10 denotes a light-transmitting body, which is made of plastic or glass materials, transmits the light emitted from the first light-emitting section 3a of the light-guiding element 2 and the light reflected from the reflector 5 to irradiate the document 1, and transmits the light reflected from the document 1 to cause the light to strike on the rod lens array 6. Reference numeral 11 denotes electronic parts mounted on the sensor substrate 8, and electrically connected with the sensor 7, with the electronic parts including an ASIC (Application Specific Integrated Circuit) that performs signal processing in synchronization with a CPU and a RAM. Reference numeral 12 denotes a connector for input and output signals interface including an output of the photoelectric conversion carried out by the sensor 7 and an output of the signal processing performed by the sensor. Whereupon, an auxiliary line indicating the optical axis lies on the optical axis of the lens array 6, and optical information of the document 1 in the vicinity of a focal plane of the lens array 6 forms an image on the light-receiving section 7 as information of the focal area of the lens array 6.

Figure 2:
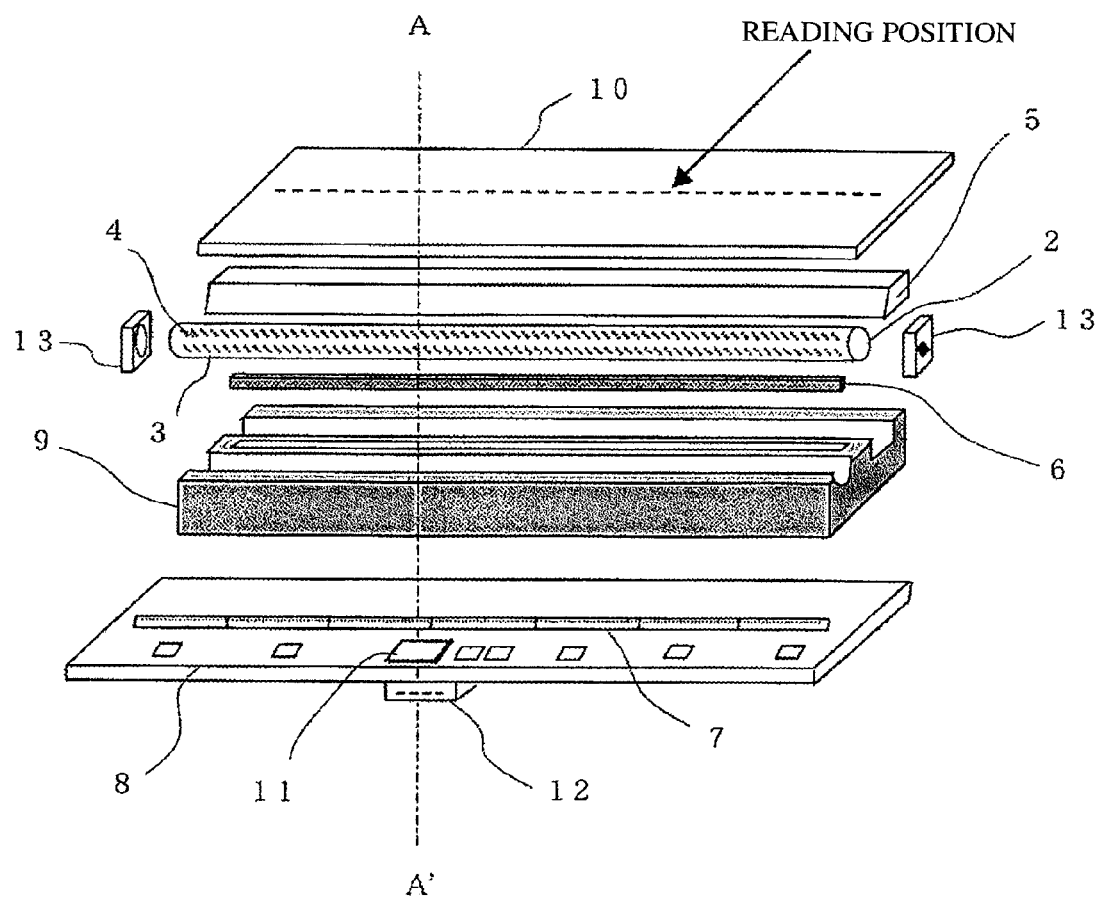
FIG. 2 is an exploded view of the image sensor according to the first embodiment of the present invention.

FIG. 2 is an exploded assembly view of a contact image sensor according to the first embodiment. In this connection, FIG. 1 is a sectional view of the image sensor in the state where the sensor is cut along line A-A' of FIG. 2 and is assembled. Referring to FIG. 2, reference numeral 13 denotes LED boards attached to each end of the light-guiding element 2 and contains therein an LED chip, which emits light to the light-guiding element 2. While the arrangement in which the LED board is attached to each end of the light-guiding element, the LED board 13 may be attached to only one end of the light-guiding element 2 instead thereof. Here, in the first embodiment, the light-guiding element 2, the rod lens array 6, and the sensor 7 have length equal to or more than the effective reading width of the document (effective reading width in the main scanning direction). In FIG. 2, the same reference numeral as that in FIG. 1 denotes the same or equivalent component.

Figure 3:
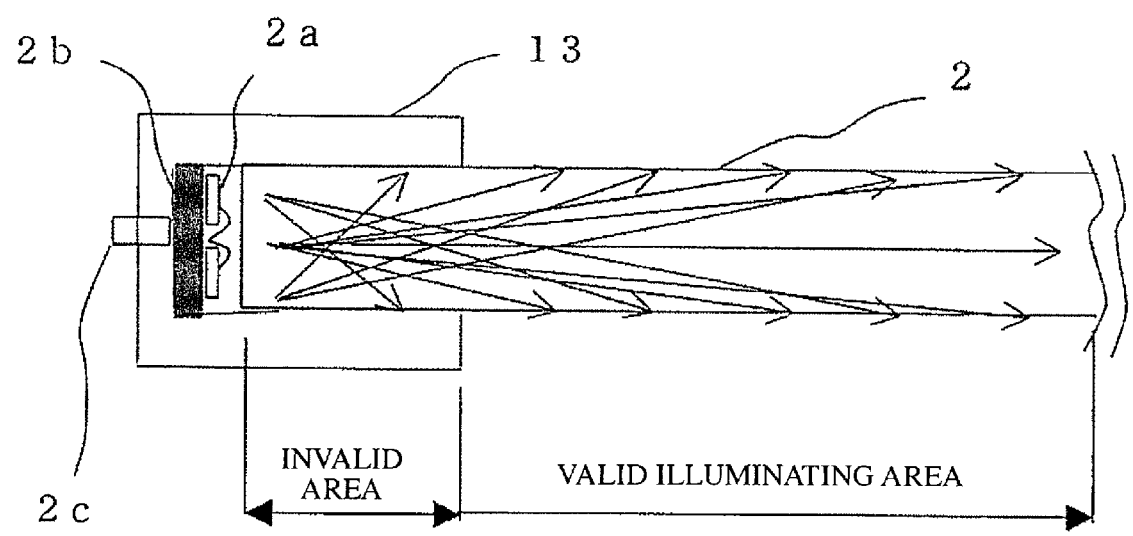
FIG. 3 is a partial sectional view explaining an irradiating direction of light from an light-guiding element of the image sensor according to the first embodiment of the present invention.

FIG. 3 is a sectional view of important points on the periphery of the end of the light-guiding element 2. Referring to FIG. 3, reference numeral 2a denotes a light source composed of an LED chip or the like; 2b denotes a substrate on which the light source 2a is mounted; and 2c denotes a terminal of a power supply for driving the light source. Light emitted from the light source 2a is incident on the light-guiding element 2 as shown in FIG. 3, and propagates in the main scanning direction, i.e., in an orthogonal direction relative to the carrying direction of the document while reflecting within the light-guiding element 2. The light in the neighborhood of the light source 2a is reflected within the internal wall of the LED board 13 so as not to be directly radiated outside and propagates in the main scanning direction so as not to be directly radiated outside. In passing, in FIG. 3, the same reference numeral as that in FIG. 2 designates the same or equivalent component.

As mentioned hereinabove, light, which is impinged on the light-guiding element 2 from the light source 2a, propagates with the light scattering by the first light-scattering layer 3 and the second light-scattering layer 4 formed on the light-guiding element 2. Light emitted from the first light-emitting section 3a and the second light-emitting section 4a of the light-guiding element 2 is emitted with uniform brightness or light intensity over the orthogonal direction relative to the carrying direction of the document 1. The emitted light irradiates the light to the irradiated portion 1a of the document 1, and the reflected light reflected from the document 1 is received by the sensor 7 through the rod lens array 6. In the light-receiving section (sensor) 7, the light is converted to an electric signal through photoelectric conversion according to its optical intensity, the electric signal is subjected to many signal processing by the ASIC 11 in the sensor substrate 8 as described above, and finally the light is output outward from the connector 12 as an image signal of the document 1.

Figure 4:
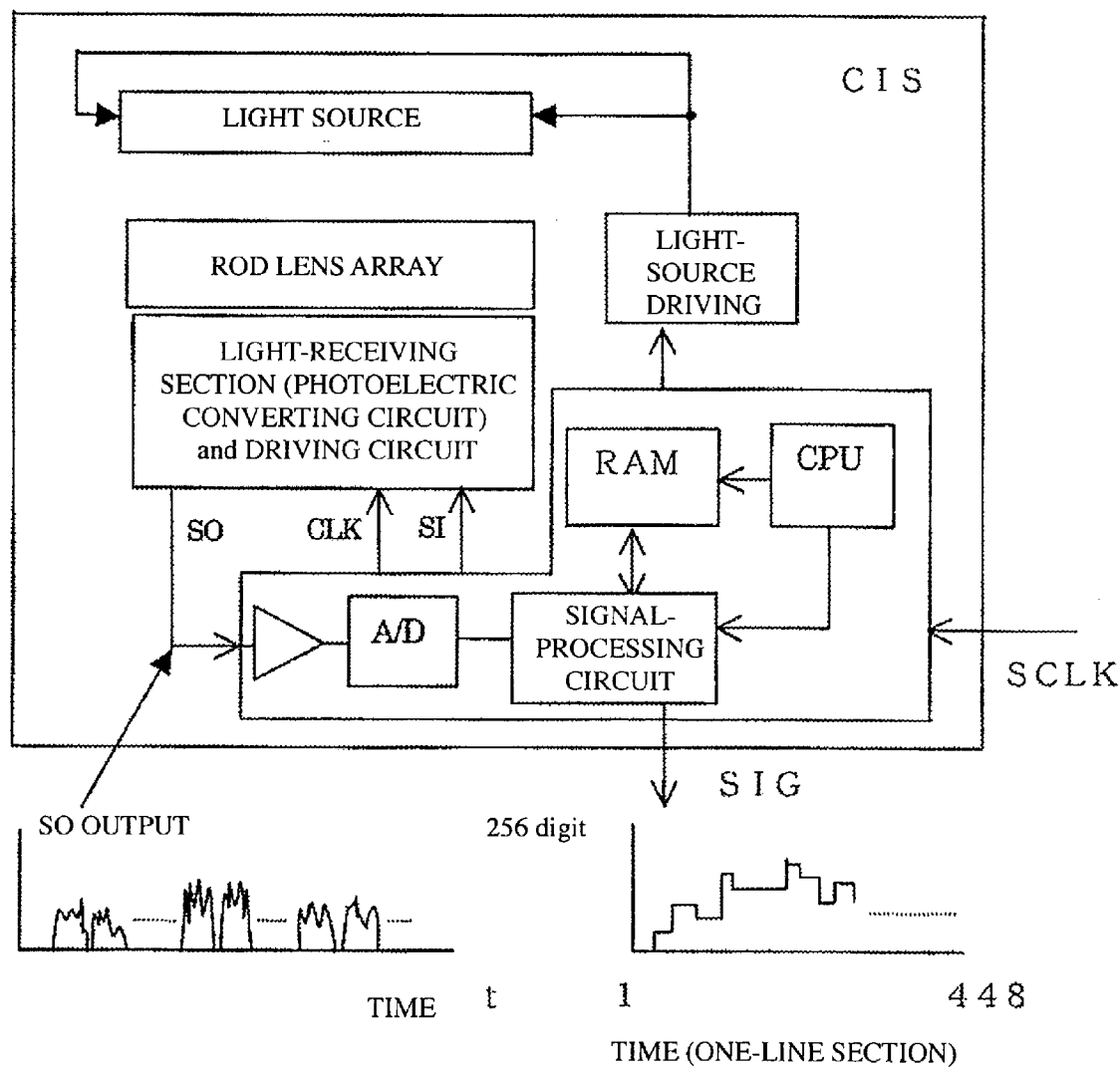
FIG. 4 is a circuit block diagram of the image sensor according to the first embodiment of the present invention.

FIG. 4 is a block diagram of the driving circuit of the contact image sensor (also referred to as a CIS). A photoelectrically converted analog output (SO) is obtained in the light-receiving section at timing of a start signal (SI) synchronized with a clock signal (CLK) of the CIS in synchronization with a system clock (SCLK) of a timing generator. The SO is analog-digital (A/D) converted by the ASIC 11, and shading correction including sample hold and all bit-correction are carried out in the signal-processing circuit. To correct signal data, data is taken from a RAM area in which the signal data is stored and a RAM area in which reference data is stored, and the data is calculated. Parenthetically, the CPU, the RAM, and the signal processing circuit of the ASIC 11 shall be referred in total to as a signal-processing section.

Figure 5:
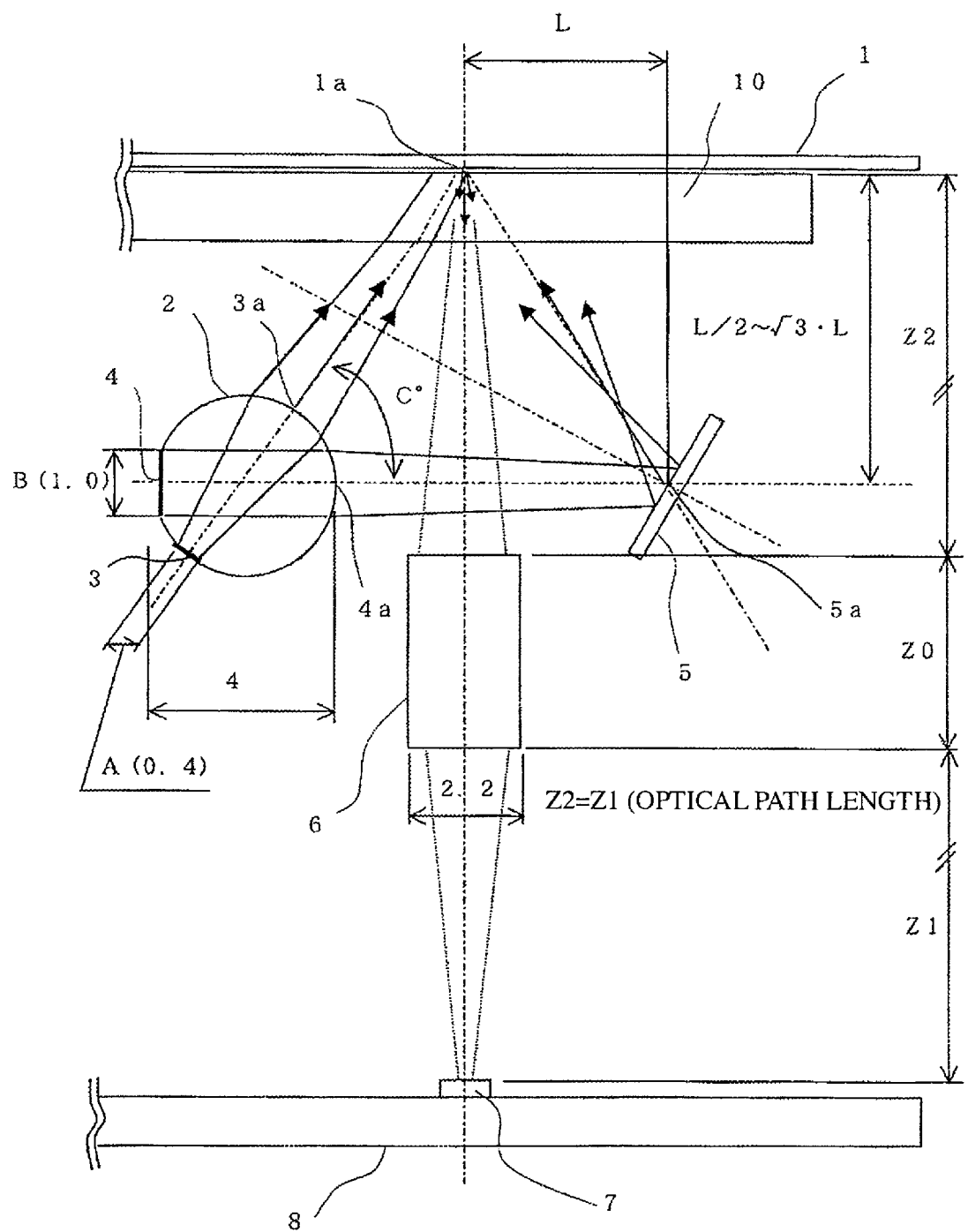
FIG. 5 is an explanatory diagram of an optical path of the image sensor according to the first embodiment of the present invention.

FIG. 5 is a schematic diagram of the optical path of the above contact image sensor. To say more precisely, FIG. 5 shows the optical path along which light emitted from the first light-emitting section 3a and the second light-emitting section 4a of the light-guiding element 2 irradiates the irradiated portion 1a of the document 1, and the reflected light passes through the rod lens array 6 to go to the sensor 7. In FIG. 5, light, which is incident on the virtually cylindrical light-guiding element 2, is scattered and reflected from the first light-scattering layer 3; part of the light is emitted from the first light-emitting section 3a, refracted by the light-transmitting body 10, and irradiates the irradiated portion 1a of the document 1. A glancing angle is defined so as to emit light from the first light-emitting section 3a at an angle of elevation C°, which is determined by an extension line linking the first light-scattering layer 3 and the central axis of the light-guiding element 2 with respect to the carrying direction of the document 1 (sub-scanning direction). Meanwhile, part of the light, which is scattered and reflected from the second light-scattering layer 4 of the light-guiding element 2, is emitted from the second light-emitting section 4a opposed thereto toward the center 5a of the reflector 5; reflected from the reflector 5; refracted by the light-transmitting body 10; and irradiates the irradiated portion 1a of the document 1. At that time, light, which goes from the second light-emitting section 4a of the light-guiding element 2 to the center of the reflector 5, travels in the carrying of the document 1.

Further, as shown in FIG. 5, the first light-scattering layer 3 and the second light-scattering layer 4 are flattened in a portion of the periphery of the cylindrical light-guiding element 2 and then applied white reflection paint to the flattened areas. Alternatively, the first and the second light-scattering layers 3, 4 may be formed by roughening a surface of these flattened areas to form light-scattering layers as a scattering layer of light. In addition, in order to balance the quantity of light emitted from the first light-emitting section 3a of the first light-scattering layer 3 and that emitted from the second light-emitting section 4a of the second light-scattering layer 4, while the scattering area of the first light-scattering layer 3 has section width of 0.4 mm, the second light-scattering layer 4 has section width of 1.0 mm wider than that of the first light-scattering layer 3. Further, as shown in FIG. 5, let the length in the optical axis direction of the rod lens array 6 be Z0, the distance between an outgoing end of light of the rod lens array 6 and the sensor 7 be Z1, and the distance between an end of incidence of light of the rod lens arrays 6 and the document 1 be Z2, the rod lens array 6 is disposed so as to be Z2=Z1 (optical path length). Furthermore, let the optical path length between the irradiated portion 1a of the document 1 and the center 5a of the reflector 5 in the carrying direction of the document 1 be L, the reflector 5 is disposed such that the optical path length between the irradiated portion 1a of the document 1 and the center 5a of the reflector 5 in the optical axis direction is within the range of L/2 to $\sqrt{3}\cdot L$. When the central axis of the reflector 5 is located within the above-described fixed range in the optical axis direction, light emitted from the first light-emitting section 3a and that emitted from the second light-emitting section 4a efficiently impinge on the irradiated portion 1a of the document 1, thus enabling reading of the document 1, even if the document 1 is waving due to such as rumples.

Figure 6:
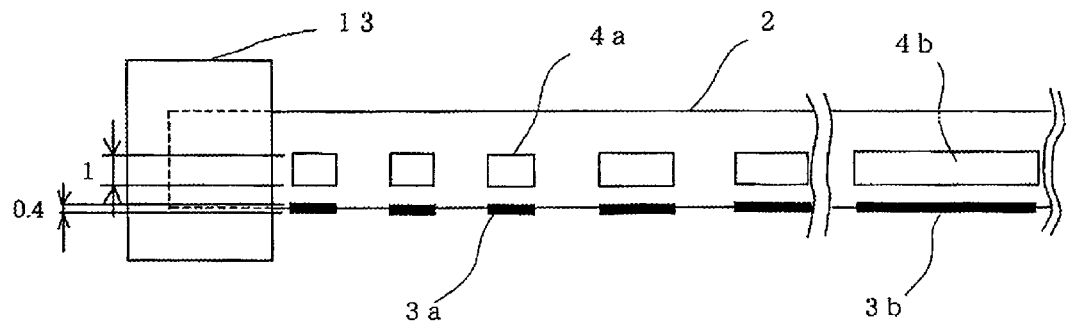
FIG. 6 is a partial sectional view of the light-guiding element of the image sensor according to the first embodiment of the present invention.

FIG. 6 is a sectional view showing pattern forms of the first light-scattering layer 3 and the second light-scattering layer 4 of the light-guiding element 2 in the main scanning direction (in the orthogonal direction relative to the carrying direction of the document 1). Referring to FIG. 6, the first light-scattering layer 3 is dispersedly disposed along the main scanning direction, and the scattering layer is formed into reflecting patterns that become wider with distance from the LED board 13. For example, in FIG. 6, it is arranged that each of three reflecting patterns close to the LED board 13 have the same width, and the reflecting patterns that become wider with distance from the LED board 13. Thus, a plurality of reflecting patterns are each disposed such that their widths become wider in succession with distance from the light source. This holds true for the second light-scattering layer 4, as shown in FIG. 6, i.e., that the second light-scattering layer 4 is made a pair of each of the reflecting patterns of the first light-scattering layer 3, and are also placed such that their widths become wider in order with distance from the LED board 13. The first and the second light-scattering layers 3, 4 thus placed as above light, which is incident on the light-guiding element 2 from the light source within the LED board 13, propagates with the light totally reflecting therein. This enables a uniform emission of light from the first light-emitting section 3a and the second light-emitting section over the main scanning direction. Instead, although the first light-scattering layer 3 and the second light-scattering layer 4 are disposed such that each of their reflecting patterns pairs up with one another, the reflecting patterns may be alternately placed, or be placed partially overlapped.

Figure 7:
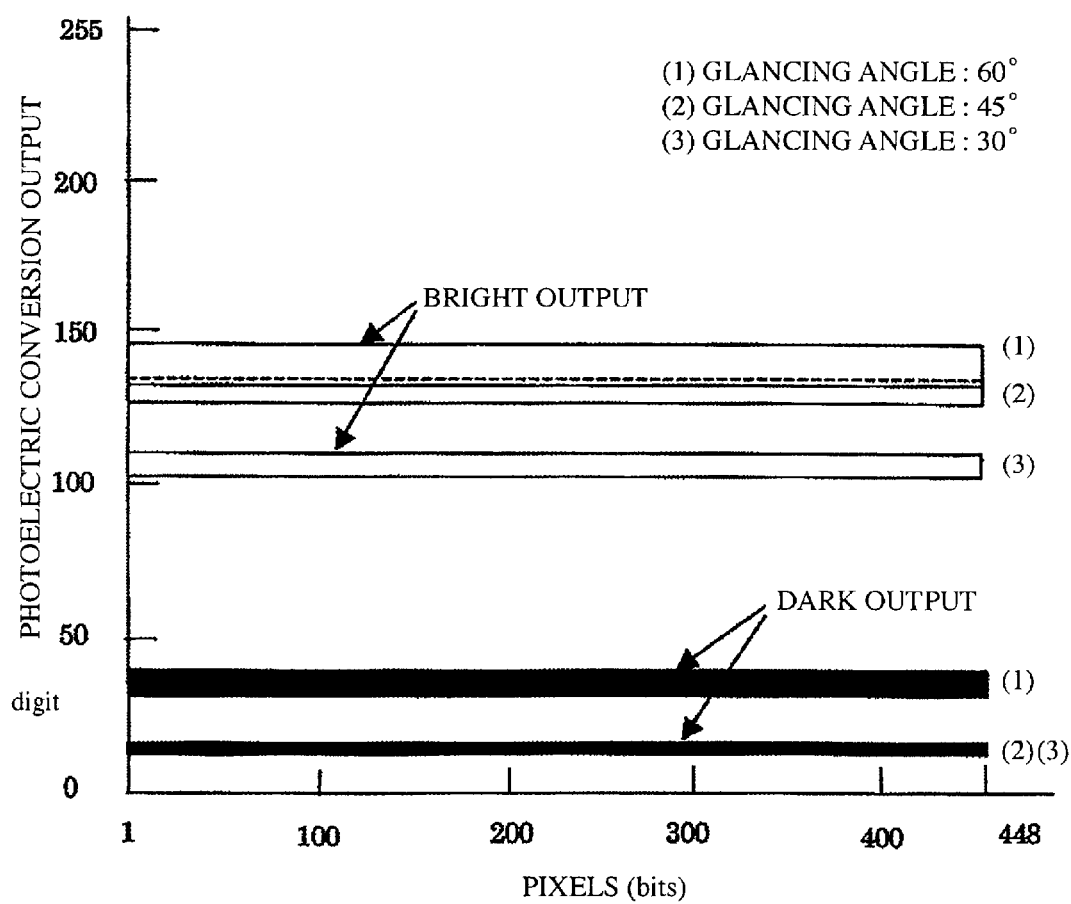
FIG. 7 is a graph of an output of a photoelectric conversion in the case where an irradiation angle of the light-guiding element of the image sensor according to the first embodiment of the present invention is changed.

FIG. 7 is a graph showing an output of the photoelectric conversion versus each of pixels (bits) of the sensor 7 disposed in the main scanning direction when irradiating light with a glancing angle C changed relative to the first light-emitting section 3a of the first scattering layer 3. A bright output indicates the case of irradiating light to a white document, and a dark output indicates the case of irradiating light to a black document. Here, respective output values will be explained by using digitalized output values after being subjected to all bit-correction. In FIG. 7, while a remarkable difference in an output of the bright output is not observed at a glancing angle C of 45° to 60°, a drop in the bright output is perceived at a glancing angle of 30°. Further, while a noticeable difference in an output of the dark output is observed at a glancing angle of 30° to 45°, a rise in the dark output is perceived at a glancing angle of 60°. Accordingly, in order to properly ensure a dynamic range that is a difference between the bright output and the dark output, it is favorable to set a glancing angle to 45° so at which the bright output is high and the dark output is low. This may be considered to be because when the glancing angle is set to 60° or more, light from the light-guiding element 2 is reflected on a surface of the document; however, part of direct light reflected therefrom is converged by the rod lens array 6 as unnecessary light. Moreover, this may be considered to be because when the glancing angle is set to 30° or less, light from the light-guiding element 2 is reflected on the surface of the document; however, the scattered light reflected therefrom is not efficiently converged by the rod lens array 6. Therefore, where the glancing angle C is set to 30° to 60°, the distance in the optical axis direction from the center 5a of the reflector 5 to the irradiated portion 1a of the document 1 is set within the range of L/2 to $\sqrt{3}\cdot L$, within the range smaller than the focal distance (Z2) from the end of incidence of the rod lens array 6 to the irradiated portion 1a of the document 1. This insures an appropriate dynamic range.

Figure 8:
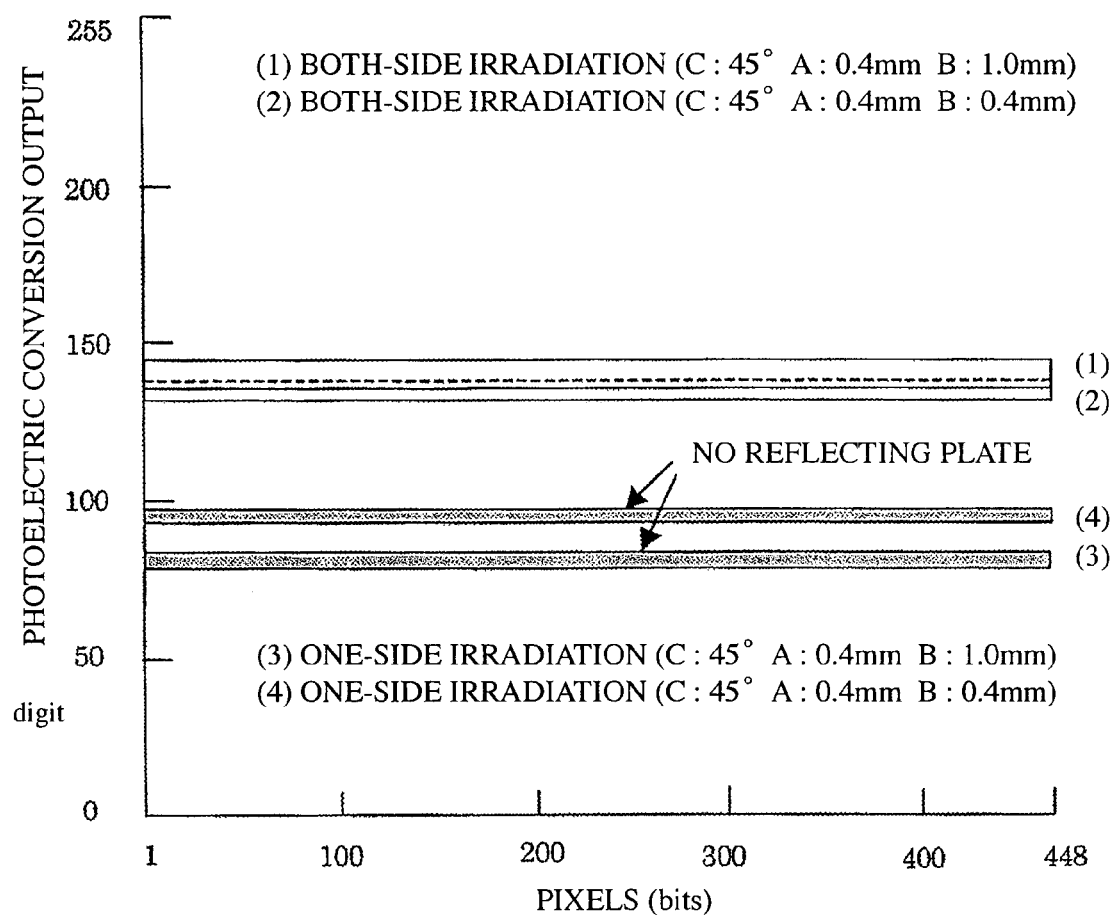
FIG. 8 is a graph of an output of the photoelectric conversion illustrated in contradistinction with each other in accordance with the existence of a reflector of the image sensor according to the first embodiment of the present invention.

FIG. 8 is a graph showing an output of the photoelectric conversion of pixels (bits) of the sensor 7 disposed in the main scanning direction when a glancing angle is set to 45° in the first light-emitting section 3a of the first light-scattering layer 3, light is emitted in the carrying of the document 1 from the second light-emitting section 4a of the second light-scattering layer 4. In FIG. 8, a bright output indicates the case of irradiating light to a white document, and a dark output indicates the case of irradiating light to a black document. Here, respective output values will be explained by using digitalized output values after being subjected to all bit-correction (digitalized output values).

Referring to FIG. 8, in the absence of the reflector 5, i.e., in case of one-side irradiation, an output of the photoelectric conversion is totally dropped, and when the pattern width 4b of the reflecting pattern of the second light-scattering layer 4 is 1.0 mm, an output is about 80 digits in mean value, and when the width is 0.4 mm, an output is about 95 digits in mean value. By contrast, where the reflector 5 is provided in opposition to the light-guiding element 2, when the pattern width 4b of the reflection pattern of the second light-scattering layer 4 is 1.0 mm, an output is about 140 digits, and when the pattern width 4b is 0.4 mm, an output is 135 digits. That is, when the pattern width 4b of the second light-scattering layer 4 is wide, a contribution rate of the light impinging on the document 1 from the reflector 5 is slightly improved as compared with the case where the pattern width thereof is the same as that of the pattern 3b of the first light-scattering layer 3. Parenthetically, when it is devoid of the second light-scattering layer 4 therein, the quantity of light impinging on the document 1 from the reflector 5 is extremely dropped, largely loosing a balance of the quantity of light impinging on the irradiated portion 1a of the document 1 from both sides.

The image sensor thus arranged as above, even when shading is produced in areas in which an illumination to the document 1 is intercepted by waves due to such as rumples, enables light to be irradiated to the shaded areas of the document.

Second Embodiment

Figure 9:
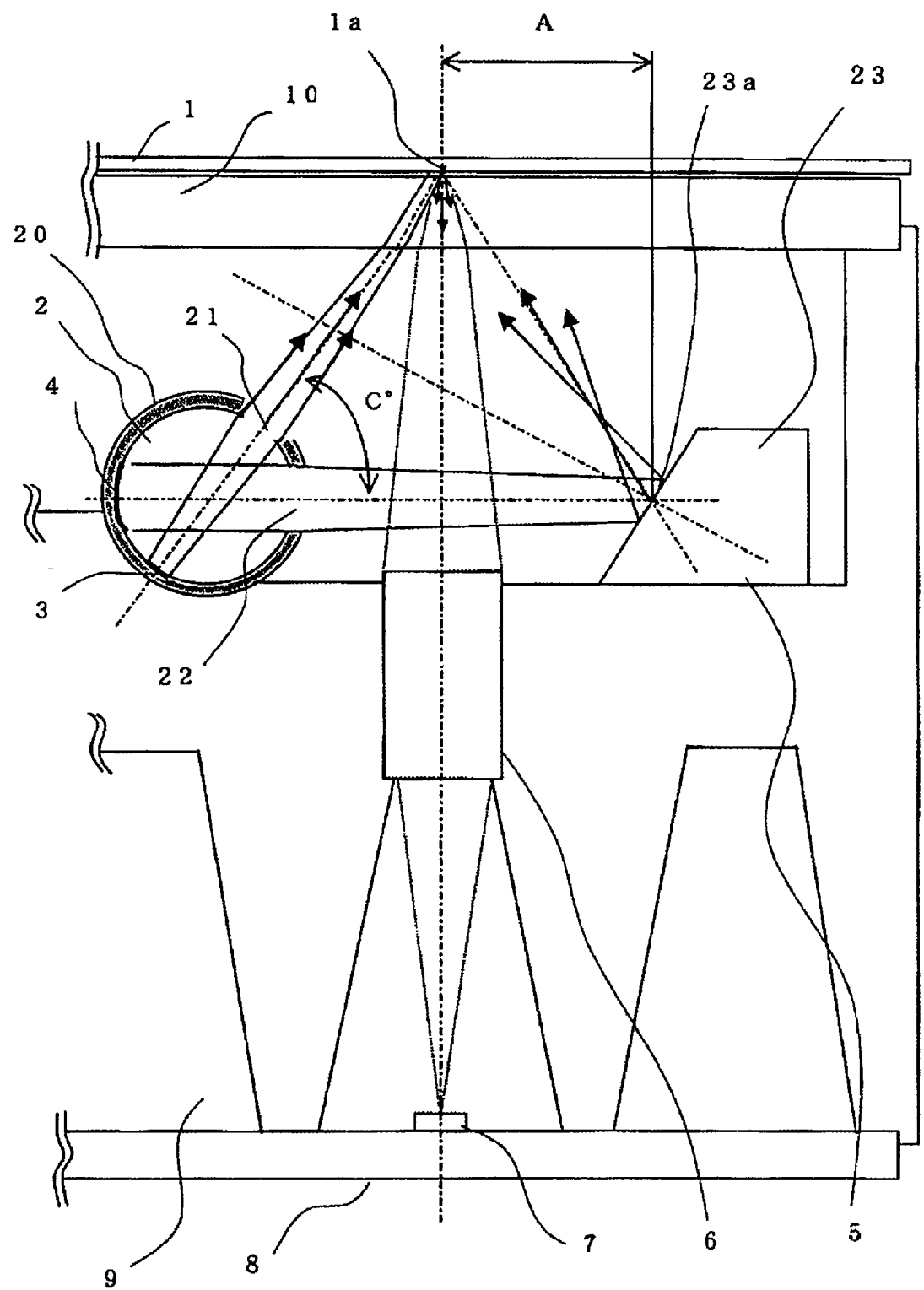
FIG. 9 is an explanatory diagram of an optical path of the image sensor according to the second embodiment of the present invention.

The contact image sensor according to the second embodiment will be explained by referring to FIG. 9 and FIG. 10. FIG. 9 is an explanatory diagram of the structure of the contact image sensor according to the second embodiment. Referring to FIG. 9, reference numeral 20 denotes a shading cover (cover), which covers the light-guiding element 2 and is made of white plastic material. Reference numeral 21 denotes a first light-emitting section, which is formed at a position opposed to the first light-scattering layer 3 and is made of a slit formed through the cover 20. Further, reference numeral 22 denotes a second light-emitting section, which is formed at a position opposed to a second light-scattering layer 4 and is made of a slit formed through the cover 20. In FIG. 9, the first light-emitting section 21 and the second light-emitting section 22 are made of the cover 20. Here, as the cover 20 is also provided in an intermediate area between the first light-emitting section 21 and the second light-emitting section 22, the first light-emitting section 21 and the second light-emitting section 22 are physically separated. Alternatively, the first light-emitting section 21 and the second light-emitting section 22 may be arranged without providing the cover 20 therebetween. In this case, the first light-emitting section 21 and the second light-emitting section 22 are not naturally separated from each other; however, there is no change in that the first light-emitting section 21 and the second light-emitting section 22 are made of the cover 20. The second embodiment also encompasses such an aspect. Further, reference numeral 23 denotes a reflector (reflecting plate) such as a mirror, and a reflecting member reflecting light is provided at its slanted portion. Other configurations thereof are the same as those of the first embodiment. For example, the configurations of the first and the second light-scattering layers formed on the light-guiding element 2 are the same as with the first embodiment.

The contact image sensor is arranged as described above, and therefore, light, which is incident on the light-guiding element 2 from the light source 2a shown in FIG. 3, is emitted from the first light-emitting section 21 and the second light-emitting section 22 outside the light-guiding element 2. Light, which is emitted from the first light-emitting section 21, directly irradiates the irradiated portion 1a of the document 1; and light from the second light-emitting section 22 is reflected from the reflector 23, and irradiates the irradiated portion 1a of the document 1 from an opposite end of the first light-emitting section 21 with respect to the rod lens array 6. The reflected light reflected from the document 1 is converged through the rod lens array 6, and then is received by the sensor 7. Such an optical sequence is similar to that of the first embodiment.

Further, light, which is incident on the first light-scattering layer 3 provided on the virtually cylindrical light-guiding element 2, is scattered and reflected, and part of the light is emitted from the light-emitting section 21 facing thereto toward the document 1. The first light-scattering layer 3 is irradiated at an angle of elevation C° relative to a horizontal line extended in the sub-scanning direction (carrying direction of the document 1) located in the central axis of the light-guiding element 2. Furthermore, light, which is incident on the second light-scattering layer 4, is also scattered and reflected; and part of the light is emitted from the light-emitting section 22 opposed thereto toward the reflector 23; and the light reflected from the reflector 23 illuminates the document 1.

It should be appreciated that the first light-scattering layer 3 and the second light-scattering layer 4 are flattened in a part of the periphery of the cylindrical light-guiding element 2 and then white reflecting paint is applied to the flattened area. A surface of the flattened area is roughened by means of chemical treatment or physical grinding processing such as sandblasting or the like, and the obtained area may be used as a scattering and reflecting area. In addition, in order to balance the quantity of light emitted from the first light-emitting section 21 of the first light-scattering layer 3 and that emitted from the light-emitting section 22 of the second light-scattering layer 4, while the first light-scattering layer 3 is arranged to have section width of 0.4 mm, the second light-scattering layer 4 is arranged to have section width of 1.0 mm wider than that of the first light-scattering layer 3.

Figure 10:
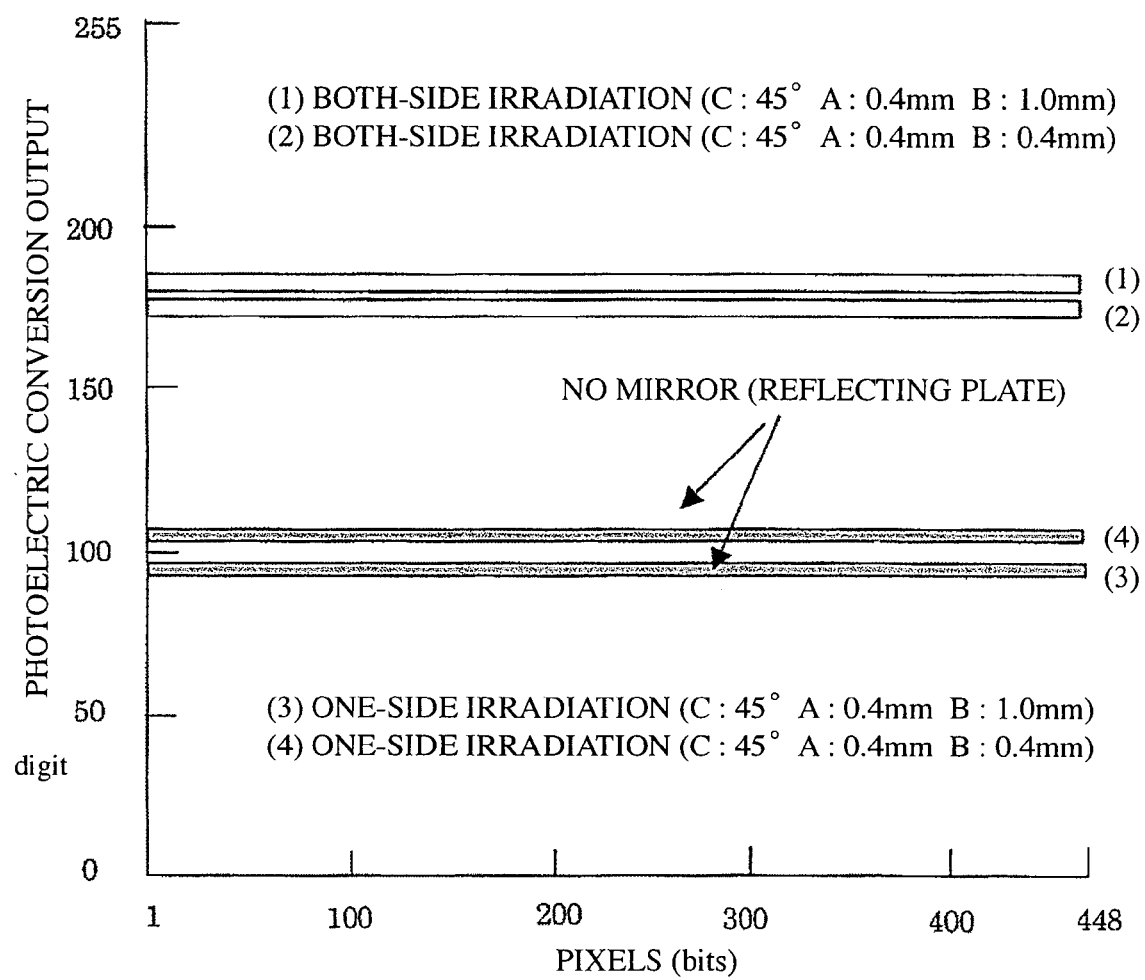
FIG. 10 is a graph of an output of the photoelectric conversion illustrated in contradistinction with each other in the case where a cover is attached to the light-guiding element of the image sensor according to the second embodiment of the present invention.

FIG. 10 is a graph showing an output of the photoelectric conversion of the pixels (bits) of the sensor 7 disposed in the main scanning direction in circumstances where a glancing angle is set to 45° with respect to the light-emitting section 21 of the first light-scattering layer 3, and light emitted from the light-emitting section 22 of the second light-scattering layer 4 is irradiated in substantially parallel with a carrier surface of the document. A bright output indicates the case of irradiating light to a white document, and a dark output indicates the case of irradiating light to a black document. Here, output values will be explained by using digitalized output values after being subjected to all bit-correction (digitalized output values).

In FIG. 10, in the absence of the reflector 23, i.e., in case of one-side irradiation, an output is 105 digits when the pattern width 4*b* of the second light-scattering layer 4 is 1.0 mm, and an output is 95 digits when the pattern width is 0.4 mm. By contrast, when the reflector 23 is disposed in opposition to the light-guiding element 2, an output is 180 digits when the pattern width 4*b* of the second light-scattering layer 4 is 1.0 mm, and an output is 170 digits when the pattern width is 0.4 mm. That is, it will be realized that when the pattern width 4*b* of the second light-scattering layer 4 is wide, a contribution rate of the light impinging on the document 1 from the reflector 23 is extremely improved, as compared with the case where the pattern width thereof is the same as the pattern width 3*b* of the first light-scattering layer 3. Further, variation in an output of the photoelectric conversion (variation between pixels) after correction is also improved, which should primarily be unambiguous. Additionally, in the absence of the second light-scattering layer 4 therein, it experiences excessive reduction of the quantity of light incident on the document 1 from the reflector 23, largely loosing a balance the quantity of light impinging on the irradiated surface of the document 1 from both sides.

As mentioned above, the provision of the cover 20 in dedicated light-emitting sections 21, 22 so as to cover the light-guiding element 2 enables unnecessary light, which is diffused from the light-guiding element 2, to be taken in within the light-guiding element 2 again from the cover 20, and the light to be re-radiated as effective light from the light-emitting face of the light-guiding element 2. Further, light emitted from the light-emitting section 21 and the light-emitting section 22 are emitted in a NARROW GLOBE shape relative to an irradiating direction, and light emitted from the light-emitting section 21 and light, which is reflected from the reflector 23 and illuminates a surface of the document, are concentrated onto and illuminate a focal position of the document 1. As a result, it can prevent unnecessary light, which is scattered from thin line images of the document 1, from impinging on the lens array 6.

In the first embodiment and the second embodiment, light emitted from the second light-emitting sections 4*a*, 22 is arranged to be irradiated to the reflectors 5, 23 in the carrying direction of the document, and light reflected from the reflectors 5, 23 is irradiated to the irradiated portion 1*a* of the document 1. However, a similar effect can be exerted within a range smaller than the focal distance (Z2) from the end of incidence of the rod lens array 6 to the irradiated portion 1*a* of the document 1 by disposing the reflectors 5, 23 so that the centers 5*a*, 23*a* thereof approach the surface of the document 1 in the optical axis direction; irradiating light in an oblique direction, which is emitted from the second light-emitting sections 4*a*, 22, to the reflectors 5, 23 in the carrying direction of the document 1; and irradiating the light to the irradiated portion 1*a* of the document 1 with a glancing angle of the reflectors 5, 23 changed.

Furthermore, since a similar effect can also be exerted with the lens 6 of which conjugation length Z (Z0+Z1+Z2) is long on account of its long focal distance by disposing the reflectors 5, 23 so that the centers 5*a*, 23*a* thereof approach the sensor 7 in the optical axis direction; disposing the second light-scattering layer 4 so as to approach a surface of the document in the optical axis direction; irradiating light in an oblique direction, which is emitted from the second light-emitting sections 4*a*, 22, to the reflectors 5, 23 in the carrying direction of the document 1; and irradiating the light to the irradiated portion 1*a* of the document 1 with the glancing angle of the reflectors 5, 23 changed.

What is claimed is:

1. An image sensor comprising:
   a light source;
   a light guide having a rod-like shape, providing said light source at both sides thereof, and including: a first emitting section for emitting light from an oblique direction with reference to a radiated section of a sheet of copy, with light of said light source being propagated in a main scanning direction with reflection inside thereof; and a second emitting section for emitting light in the transmitting direction of said sheet of copy;
   a lens body for converging light reflected from said radiated section of said sheet of copy;
   a sensor for receiving light passed through said lens body;
   a reflection body, positioned at an opposite side of said light guide with reference to said lens body, for emitting light from an oblique direction with reference to said radiated section of said sheet of copy, with light from said second emitting section being reflected such that a light path of said light emitted from said second emitting section is in between said lens body and said sheet of copy; and
   first and second light scattering layers respectively formed to sections facing said first and second emitting sections in said light guide, wherein
   light reflected by said first and second light scattering layers is emitted through said first and second emitting sections.

2. An image sensor comprising:
   a light source;
   a light guide having a rod-like shape, providing said light source at one end thereof or both sides thereof, and including: a first emitting section for emitting light from an oblique direction with reference to a radiated section of a sheet of copy, with light of said light source being propagated in a main scanning direction with reflection inside thereof; and a second emitting section for emitting light in the transmitting direction of said sheet of copy;
   a rod lens array, extending in said main scanning direction, for converging light reflected from said radiated section of said sheet of copy;
   a sensor for receiving light passed through said rod lens array;
   a reflection body, positioned at an opposite side of said light guide with reference to said rod lens array, for emitting light from an oblique direction with reference to said radiated section of said sheet of copy, with light from said second emitting section being reflected such that a light path of said light emitted from said second emitting section is in between said rod lens array and said sheet of copy; and
   first and second light scattering layers respectively formed to sections facing said first and second emitting sections in said light guide, wherein,
   light reflected by said first and second light scattering layers is emitted through said first and second emitting sections, and said end section of said light guide to which said light source is positioned is light-shielded and an effective lighting region and an ineffective region are formed in said light guide.

3. An image sensor comprising:

a light source;

a light guide having a rod-like shape, providing said light source at one end thereof or both sides thereof, and including: a first emitting section for emitting light from an oblique direction with reference to a radiated section of a sheet of copy, with light of said light source being propagated in a main scanning direction with reflection inside thereof; and a second emitting section for emitting light in the transmitting direction of said sheet of copy;

a rod lens array, extending in said main scanning direction, for converging light reflected from said radiated section of said sheet of copy;

a sensor for receiving light passed through said rod lens array;

a reflection body, positioned at an opposite side of said light guide with reference to said rod lens array, for emitting light from an oblique direction with reference to said radiated section of said sheet of copy, with light from said second emitting section being reflected such that a light path of said light emitted from said second emitting section is in between said rod lens array and said sheet of copy;

first and second light scattering layers respectively formed to sections facing said first and second emitting sections in said light guide; and a light-shielding cover for covering an exterior of said light guide including said first and second scattering layers, except for said first and second emitting sections, wherein light reflected by said first and second light scattering layers is emitted through said first and second emitting sections, and said end section of said light guide to which said light source is positioned is light-shielded and an effective lighting region and an ineffective region are formed in said light guide.

* * * * *